Patented Jan. 30, 1934

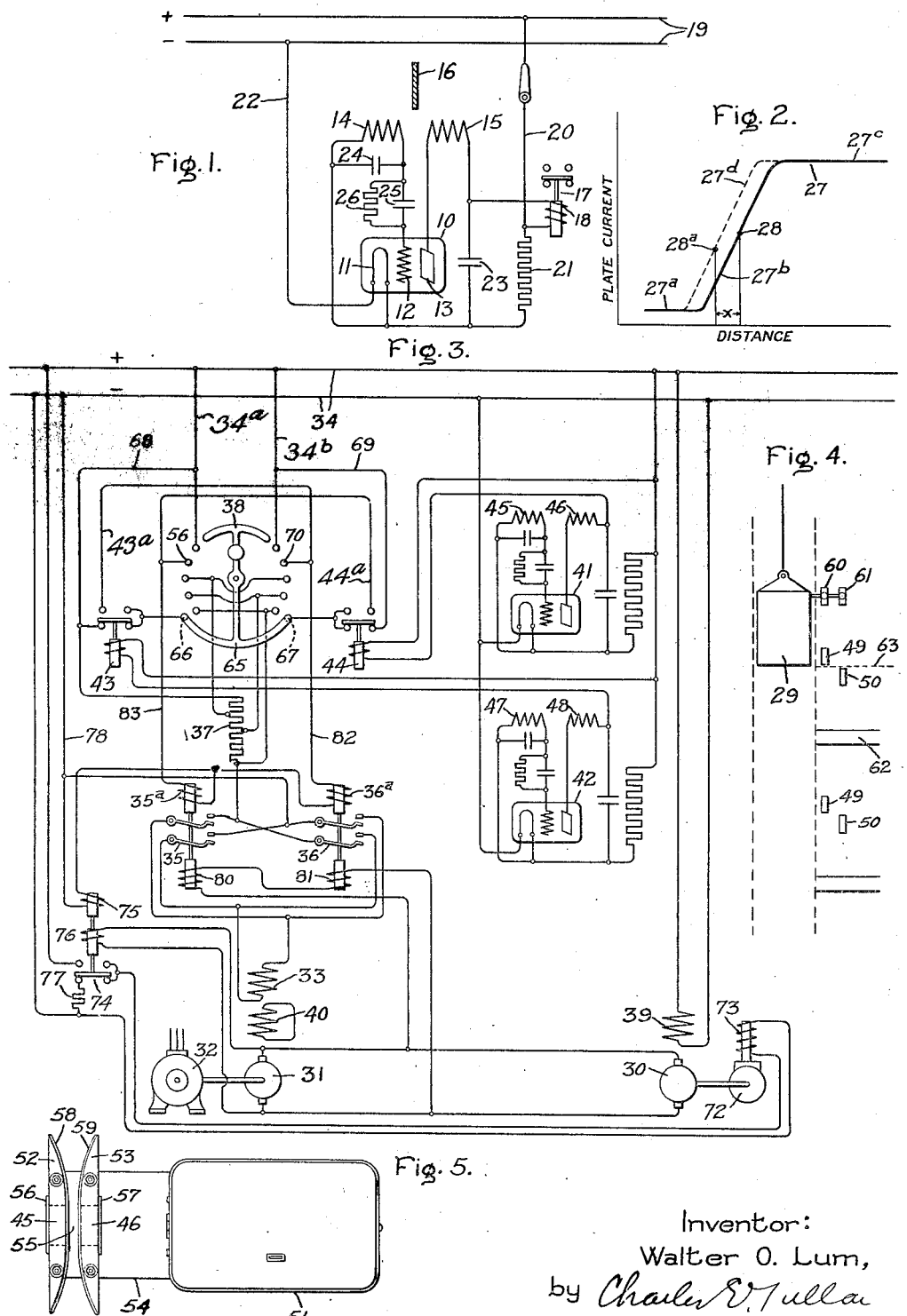

1,944,988

UNITED STATES PATENT OFFICE 1,944,988

CONTROL SYSTEM

Walter O. Lum, Schenectady, N. Y., assignor to General Electric Company, a corporation of New York Application July 24, 1928. Serial No. 295,059

30 Claims. (Cl. 187—29)

My invention relates to control systems, and has for its object the provision of a simple and reliable control system which is responsive to the relative position of a controlling element.

My invention has general application to electrical control systems for various purposes, and it is especially applicable to installations such as elevators, railway turntables, weighing devices, float controlled devices, and the like, wherein a movable member or element is provided, and wherein it is desired to effect a control operation in accordance with the movements or position of this element. Thus, the control operation may be initiated, terminated or modified in some particular way upon the arrival of the element at a predetermined position with relation to another element, which may be either movable or stationary. For example, as applied to the control of an elevator, my invention may be utilized to effect the control of the elevator itself when the elevator arrives in a predetermined position in the hatchway so as to bring the elevator to rest at the desired floor. In short, the invention has general application to control systems which are responsive to the position of one object or element with respect to a stationary or moving object.

In carrying out my invention I utilize an electrode device, and in one of its aspects my invention relates to the provision of means for varying the current in the plate or output circuit of an electrode device in accordance with the relative position of a controlling element.

Preferably I employ an electron discharge device which is connected to oscillate under certain conditions. It will be understood that when an electron discharge device, such as a three element device, is oscillating the plate current is largely pulsating, the non-pulsating direct current component of the plate current then being comparatively small, whereas under the same conditions but with the tube not oscillating the plate current is wholly non-pulsating direct current, and of much greater value. In accordance with my invention I provide control means which is responsive to this non-pulsating current in the plate or oscillation circuit, and means for varying the oscillatory condition of the electron discharge device to effect operation of the control means.

In one form of my invention, I provide an electron discharge device with a suitable control device in its plate circuit, and inductively related windings or coils in its grid and plate circuits respectively whereby an oscillatory condition is maintained in the plate circuit, together with means responsive to relative movement of a controlling element for varying this inductive relation between the coils so as to thereby effect the operation of the control device.

For a more complete understanding of my invention reference should be had to the accompanying drawing in which Fig. 1 is a diagrammatic illustration of a system of control embodying my invention; Fig. 2 is a curve showing certain features of operation, Fig. 3 is a simplified diagrammatic representation of a system of elevator control embodying my invention, Fig. 4 is a diagrammatic view showing details of operation of the system shown in Fig. 3, while Fig. 5 is a view showing details of construction.

Referring to the drawing, I have shown in Fig. 1 certain elements of my invention which have a broad application for various control purposes. For purposes of simplification the particular apparatus with which the invention might be associated has been omitted in this figure. In the specific embodiment shown I provide a three element electron discharge device or tube 10 provided with a filament or cathode 11, a grid 12 and a plate or anode 13. This electron discharge device is electrically connected in a suitable manner, so as to normally oscillate at radio frequencies, the oscillatory condition being promoted by an electrical interlinkage between the grid or input circuit and the plate or output circuit. As shown this interlinkage is an inductive one, and it is obtained by means of two inductively associated windings or coils 14 and 15 which are connected respectively in the grid and plate circuits. The inductive interlinkage may be interrupted as desired by interposing a vane 16 between the coils, this vane being made of suitable electrically conducting material such as copper, iron, etc. Preferably the vane is made of sheet iron having such thickness as to give the desired rigidity and mechanical strength. The vane when interposed between the two windings 14 and 15, but without touching the windings themselves or other parts, electrically isolates them from each other whereby the oscillations in the plate circuit cease with the result that the non-pulsating plate current increases in value and picks up a direct current relay 17, constituting a control device, the operating coil 18 of the relay being connected to the plate circuit in such manner that non-pulsating current only can pass through it. Obviously in a practical embodiment of the invention, the tube and windings or the vane or both may move, the essential feature being that the control is responsive to the relative positions of the windings and the vane.

It will be understood that any suitable electrical connections for the electron discharge device or tube may be used although as shown, it is energized from a suitable direct current source 19. The positive terminal of the supply source is connected through a conductor 20 to one terminal of a resistance 21 of relatively high value, the other terminal of the resistance being connected to one side of the filament 11 and the opposite side of the filament being connected through a conductor 22 to the negative side of the supply source. It will be observed that the filament 11 and the resistance 21 are connected in series across the supply source. The characteristics of the electron discharge device, the voltage of the supply source, and the value of the resistance 21 are so related with respect to each other that the voltage drop across the resistance gives the desired plate voltage, and also the desired filament current will flow through the filament circuit. The plate 13 is connected through the winding 15 and the winding 18 of the relay to the positive terminal of the resistance. A by-pass condenser 23 is connected across the winding 18 and the resistance. It will be understood that this condenser serves as a by-pass for the pulsating component of the plate current when the tube is oscillating, although the direct component cannot pass through the condenser and must therefore pass through the parallel circuit including the coil 18. Connected across the coil 14 is a suitable condenser 24 which forms a suitable tuned oscillation circuit with the winding 14 as is well known in the art. The customary grid-leak condenser 25 and resistance 26 in parallel therewith are provided in the grid circuit.

The current conditions in the winding 18 of the relay may be clearly understood by reference to Fig. 2 in which the curve 27 is plotted with the non-pulsating component of the plate current i. e. the current in the winding 18, as ordinates, and the distance through which the vane is moved as abscissæ. The horizontal portion 27ª indicates the non-pulsating plate current, that is, the current in the winding 18, when the discharge device is oscillating. The inclined portion 27ᵇ indicates the rise of non-pulsating current as the vane is moved between the windings 14 and 15, and the upper horizontal portion 27ᶜ shows the maximum plate current, entirely non-pulsating; when the tube has stopped oscillating. As the vane is withdrawn the tube starts to oscillate with the vane less closely associated with the windings, i. e. inserted a shorter distance between them, than when the oscillations were previously stopped as the vane was inserted, so that the current decreases when the vane is withdrawn as indicated by the dotted portion of the curve 27ᵈ. The relay 17 drops at a somewhat lower value of current than that required to pick it up. For example, it may pick up at some current value such as indicated by the point 28 and drop out at some such current value as indicated by the point 28ª.

By suitably varying the windings 14 and 15 and other constants of the circuits the response to the movement of the vane may be made very critical, that is, a very small movement of the vane will cause the relay to pick up or drop out. In other words, the portion 27ᵇ of the curve can be made very steep. I have found, for example, that the movement of the vane required between the pick-up and drop-out positions of the relay, represented by the distance X in Fig. 2, may be as small as one-eighth inch or one thirty-second inch, or even less. This is a very desirable feature of the control, since it makes possible very sensitive and accurate performance.

In Figs. 3 and 4 I have disclosed a control system for elevators embodying my invention in which the electron discharge device and inductively associated windings in its grid and plate circuits are mounted on the elevator, while vanes are mounted in the hatchway in position to come between the windings as the elevator moves upward or downward and thereby operate relays to control the elevator. Referring to Figs. 3 and 4 the elevator 29 is raised and lowered by means of a motor 30 which has a suitable driving connection with the winding drum of the elevator. This motor is electrically connected in a Ward-Leonard system to a generator 31 which is driven by a suitable driving motor 32, shown as a three-phase A. C. motor. The voltage of the generator is varied to control the motor 30 by varying the excitation of the generator field winding 33. The field winding 33 is energized from a suitable direct current source of supply 34, suitable electromagnetic reversing switches or contactors 35 and 36 being included in the connections and also a variable resistance 37, the reversing switches and the resistance being controlled by a manually operated controller or master switch 38.

With the controller 38 in the "off" position as shown in the drawing, the generator field winding 33 is deenergized and the motor 30 is therefore at rest. Movement of the switch toward the left, that is, in a counterclockwise direction, to short circuit the first two upper contacts energizes the coil 35ª which closes the switch 35, whereby the field 33 is connected to the source 34 with all of the resistance 37 in the circuit. This circuit may be traced from one side of the supply source 34, as shown the positive side, through the conductor 34ª and the switch segment 38 to the contact point 56 and thence through the conductor 83, coil 35ª, and then by way of conductor 78 back to the opposite side of the supply source. Assuming that the generator is being driven by the motor 32, this produces a low generator voltage whereby the motor is started at low speed to move the elevator downward. Continued movement of the switch 38 gradually short circuits the resistance 37 so as to increase the field excitation of the generator and thereby increase the speed of the motor. Movement of the switch 38 in the opposite direction from the off position energizes the coil 36ª which closes the switch 36 whereby the field 33 is energized in the opposite direction for the opposite direction of rotation of the motor. This circuit may be traced from the positive side of the supply source 34 through the conductor 34ᵇ and the switch segment 38 to the contact 70 and thence through the conductor 82, coil 36ª and by way of conductor 78 back to the opposite side of the supply source. Continued movement of the switch gradually short circuits the resistance 37. The field winding 39 of the motor 30 is also connected to the supply source 34. A suitable short circuited winding 40 is provided on the generator whereby the energization of the generator field is inductively prolonged after the controller 38 has been thrown to the off position so as to prevent a too sudden regenerative braking effect upon the motor 30 with the attendant too rapid deceleration of the elevator.

In the system thus far described it will be observed that the starting and stopping of the elevator is effected manually by the operator and consequently the accuracy of the stops is entirely dependent upon his judgment in controlling the elevator. In accordance with my invention I provide means for automatically controlling the operation of the elevator within a predetermined zone above and below the desired landing so that an accurate stop will be made. This automatic leveling control comprises two three-element electron discharge devices 41 and 42 for controlling the downward and upward movements of the elevator respectively, which preferably are mounted in a suitable position on the elevator itself. These devices have their grid circuits and their plate circuits energized from the supply source 34 in the manner previously described in connection with Fig. 1, and they are arranged to respectively control electromagnetic relays 43 and 44, the operating coils of which are included respectively in their plate circuits, and which in turn control the switches 35 and 36 respectively under certain conditions after the controller 38 has been thrown to the off-position to decelerate the elevator. The electron discharges devices are connected and arranged so as to normally oscillate, this condition of oscillation being maintained by means of cooperating windings or inductance coils in the grid and plate circuits. The device 41 has a winding 45 in its grid circuit which is in inductive relation with a winding 46 in its plate circuit. The device 42 is similarly provided with cooperating windings 47 and 48. The windings of each pair are spaced apart a short distance, and are mounted in such position on the elevator that metallic vanes 49 and 50 mounted in the hatchway adjacent each floor will come respectively between the windings of the two pairs when the elevator arrives at certain positions, and thereby produce an increase in non-pulsating plate current in the particular tube whereby the corresponding relay 43 or 44 is picked up to control the elevator.

I have shown in Fig. 5 a physical embodiment of the control as applied to an elevator. Each tube with its condensers and grid-leak may be suitably mounted in a rectangular metal box 51 while the two windings for the tube may be mounted respectively in rectangular blocks 52 and 53 made of a suitable electrically insulating material, such as wood, and secured to the box 51 by means of a bracket 54. The blocks 52 and 53 are rectangular in shape and are secured edgewise, as shown, to the bracket in parallel relation and spaced apart a short distance, as indicated by the reference numeral 55. The windings for the tube are inserted in central apertures in these blocks, for example, the windings 45 and 46 are shown in dotted lines in Fig. 5 as mounted in central apertures therein. The windings may be inserted from opposite sides of the blocks into the apertures provided for them and secured therein by plates 56 and 57 secured to the blocks, these plates being made of suitable electrically insulating material. The blocks have their adjacent sides beveled at each end as shown, and their adjacent faces may be provided with layers of electrically insulating material 58 and 59 for mechanical protection. These layers 58 and 59 and also the plates 56 and 57 may be made from a suitable molded phenolic condensation product. The electrical connections for the coils are led back into the box 51 in a suitable manner, for example, through suitable conduit means not shown.

It will be understood that the units such as shown in Fig. 5 will be secured to the elevator in suitable positions and with the blocks 52 and 53 vertical and so arranged that the vanes 49 and 50 in the hatchway pass between the blocks of their respective units during the movement of the elevator. The beveled ends of the blocks assure that the vane will properly pass between them although it is contemplated that the lateral freedom of the elevator in the hatchway will not be great enough under normal conditions to permit either one of the blocks to touch the vane. As shown diagrammatically in Fig. 4 two units 60 and 61, such as shown in Fig. 5, are secured to the top of the elevator, the device 60 including the tube 41 and its coils 45 and 46, and the device 61 including the tube 42 and its coils 47 and 48, the devices being in such positions as to cooperate with the vanes 49 and 50 respectively. When the units 60 and 61 are secured to the top of the elevator a considerable distance above the elevator floor, as shown in Fig. 4, and this has been found to be a convenient, practical arrangement, the vanes 49 and 50 are located in the hatchway a corresponding distance above the landing floor with which they are associated. For convenience in understanding the operation, however, the vanes may be considered as actually located at their respective floors, in which case the devices 60 and 61 would be located at the elevator floor level. The vane 49 controls the movement of the elevator in a downward direction, while the vane 50 controls the movement of the elevator in an upward direction, and the vanes of each pair may be considered as mounted respectively above and below their landing floor, although as shown in Fig. 4 they are situated above the floor. For control purposes, therefore, the landing floor level may be considered as an imaginary one midway between the corresponding pair of vanes. Thus the upper pair of vanes of Fig. 4, which are actually associated with the floor 62, may be considered as respectively above and below an imaginary floor 63, shown in dotted lines, which is the same distance above the floor 62 that the devices 60 and 61 are located above the floor of the elevator.

The arm of the controller 38 is provided with a lower electrically conducting segment 65 and two stationary contacts 66 and 67 are provided which are engaged by the extremities of the segment 65, and are thereby electrically connected, when the controller is in the off-position so as to establish a control circuit for the automatic control means. It will be understood that the segment 65 cannot engage with the remaining contacts controlled by the upper switch segment, and as shown the segment 65 is situated outside of the remaining contacts. The relays 43 and 44 are each provided with an upper and lower set of contacts with which a bridging member cooperates. When the relays are in their lowermost positions, which is normally the case, and corresponds to a condition of oscillation of the electron discharge devices, the two relays close electric circuits respectively leading from the contacts 66 and 67 to a common supply main of the source 34. As shown these connections are established through conductors 68 and 69 to the upper supply main. When the relay 43 is energized sufficiently to raise its bridging contact to short circuit its upper pair of contacts, the contact 66 is thereby electrically connected through the relay contacts and the conductor 43ª to the second right-hand upper contact 70, and similarly when the relay 44 is energized the contact 67 is thereby electrically connected through the relay contacts and the conductor 44ᵃ to the second left-hand upper contact 56.

It will be understood that suitable braking mechanism will be provided. I have shown, for example a solenoid actuated brake 72 on the shaft of the motor 30 and with an operating coil 73 which when energized releases the brake against the tension of a spring or other means (not shown) tending to hold the brake applied. The coil 73 is energized from the supply source 34 and is controlled by an electromagnetic switch 74 in its circuit. The switch 74 is provided with upper and lower contacts and a movable bridging member adapted to cooperate therewith, the bridging member being raised to its upper position into engagement with the upper contacts, whereby the circuit of the brake coil 73 is closed, by means of a coil 75 or 76. When the bridging member is released it drops to its lowermost position into engagement with its lower pair of contacts whereby the brake coil 73 is disconnected from the supply source and short circuited through a discharge resistance 77.

The coil 75 of switch 74 is included in a common circuit including the conductor 78 for the actuating coils 35ᵃ and 36ᵃ of the switches 35 and 36, and consequently when either one of the switches 35 or 36 is closed, coil 75 is energized which closes switch 74 and releases the brake. The second coil 76 for switch 74 is connected directly across the armature terminals of the generator 31 so as to be responsive to the voltage across the generator armature. Consequently coil 76 tends to assist coil 75 in maintaining the switch 74 closed when the generator is supplying current to the motor, i. e. during elevator operation, but the coil 76 is furthermore energized when the motor 30 is being overhauled by the elevator during deceleration and is acting as a generator to supply current to the generator 31 for regenerative braking. The coil 76 therefore holds the brake released during deceleration after the coil 75 has been deenergized by movement of the controller to the off-position.

In operation, the elevator is started and accelerated by means of the controller 38 and as long as the controller is maintained in any running position the automatic control means is ineffective, and the elevator will run past the various floors without stopping, since it is only when the controller is in the off-position and contacts 66 and 67 are thereby electrically connected, that the relays 43 and 44 can control the operation of the elevator. When it is desired to stop at a particular floor, the operator will move the controller 38 to the off-position at the proper point in the travel of the elevator to make a stop at that floor. The operator, for example, may use his own discretion in throwing the controller 38 to the off-position or suitable signaling means (not shown) may be provided whereby the operator will be given a visual or audible signal at the proper moment to throw his controller to the off-position. When the controller is thrown to the off-position, as shown in the drawing, the generator field winding 33 is deenergized and the motor is thereupon regeneratively braked to decelerate the elevator, power being returned to the alternating current supply circuit by the driving motor 32 which then acts as a generator, it being driven by the generator 31 which is then acting as a motor. The decay of the field of the generator 31 is modified by the inductive effect of the short circuited winding 40 so as to give the desired braking effect and, hence, the desired deceleration of the elevator with due regard to the comfort of the passengers and speed of operation.

The elevator will thus be regeneratively braked until when it arrives sufficiently near the floor for one or the other of the vanes to take control, the speed, assuming the controller to have been thrown to the off-position at the proper time, will have been reduced to some predetermined low speed at which the proper vane can take control. The speed at which the vanes can take control is determined by means of auxiliary coils 80 and 81 provided respectively for the switches 35 and 36, and arranged to apply power when energized tending to hold the switches open. These coils are connected in series across the generator 31 and are so arranged that with the elevator speed above a predetermined value such, for example, as 25% of the full running speed, they will be energized sufficiently by the generator voltage corresponding to these speeds to prevent the switches 35 and 36 from being closed, either by the vanes or by the controller 38. This also prevents reversal of the generator field and consequent plugging of the motor by the controller at any speed above this predetermined speed. It will be understood, however, that the coil 80 or 81 cannot exert sufficient force to open the switch 35 or 36 while it is being held in closed position by the coil 35ᵃ or 36ᵃ as, for example, when the elevator is being operated at a high speed by the controller 38.

The zone extending a short distance above and below each landing, such as a few inches to a foot or more above and below the landing, in which the vanes have control may be termed the leveling zone. It will be understood that the controller 38 should be thrown to the off-position at such distance from the desired landing that the elevator upon arriving at the leveling zone will have been decelerated to the predetermined low speed at which the vanes can take control, or some lower speed. Of course, if the controller is thrown to the off-position too early so that the elevator is decelerated and stopped before the leveling zone is reached, then it must be restarted by manual operation of the controller, and the same procedure would be followed if the controller were thrown too late to the off-position, so that the elevator would run through the leveling zone and be subsequently stopped.

When the elevator arrives at a leveling zone, the vanes control the switches 35 and 36 so as to continue the operation of the elevator at slow speed, or further decelerate it, or reverse it as required. For example, the elevator may tend to come to rest normally before the floor is reached, but within the leveling zone, in which case the movement of the elevator is automatically continued. Or the elevator may arrive at the leveling zone at a speed which is low enough for the vanes to take control but still high enough to cause the elevator to overrun the floor. In the latter case the elevator will be reversed and brought back to the floor.

With the elevator proceeding in a downward direction, an appropriate downward vane 49 corresponding to the desired floor will come between the coils 45 and 46 of the downward electron discharge device, whereby the relay 44 is picked up to energize the coil 35ᵃ which closes the downward running contactor 35. This circuit for the coil 35ᵃ leads from one side of the supply source 34 through the supply conductor 78 and the brake coil 75 to the coil 35ª, and thence through the conductor 83, conductor 44ª, the upper pair of contacts of the relay 44, the controller segment 65, the lower pair of contacts of the relay 43, which is in its lowermost position, the conductor 68, and the conductor 34ª, back to the opposite side of the supply source. The closing of the switch 35 connects the field winding 33 to the supply source with the entire amount of the resistance 37 in series with the field winding, the electrical connections being established through the conductors 34ª and 68 leading from one side of the supply source to one terminal of the resistance, thence through the resistance and the upper contact of the switch 35 to the winding 33 and from the opposite terminal of the winding back through the lower contact of the switch 35 and conductor 78 to the opposite side of the supply source. The generator 31 is thus caused to supply a low voltage to the motor 30 which would tend to drive the elevator at a low leveling speed, for example, 4 or 5% of the running speed, through the remaining short distance before the desired floor is reached. The vane 49 extends downward for such distance as to continue this low speed operation of the elevator, assuming that the elevator tends to stop before the floor is reached, until when the elevator is accurately leveled with the desired floor, the coils 45 and 46 arrive at a point sufficiently below the vane 49 that the inductive relation between the coils is re-established whereupon the electron discharge device resumes oscillation. This causes the relay 44 to drop thereby opening the circuit of coil 35ª whereby the switch 35 is opened and the field winding 33 deenergized. Thereupon, due to the low voltage on the generator armature, the coil 76 will be no longer energized sufficiently to retain the switch 74 in its uppermost position and the switch will drop and deenergize the brake coil 73. This allows the brake to be applied by its bias mechanism (not shown) and the elevator is thereupon brought to rest accurately leveled with the desired floor.

When the elevator is traveling upward, a vane 50 takes control as the desired landing is approached, as will be understood from the previous description in connection with the downward operation, to interrupt the inductive relation between the windings 47 and 48 whereby the relay 43 is picked up to close the circuit for the coil 36ª which closes the upward contactor 36. This circuit for the coil 36ª leads from one side of the supply source, through the conductor 78 and the brake coil 75 to the coil 36ª, and thence through the coil, conductor 82, conductor 43ª, the upper pair of contacts of the relay 43, switch segment 65, the lower pair of contacts of the relay 44, and the conductors 34ᵇ and 69 to the opposite side of the supply source. The closing of the switch 36 connects the field winding 33 to the supply source with reversed polarity with respect to the connection established by switch 35, the entire amount of resistance 37 being included in series with the field winding 33. These connections may be traced from one side of the supply source through the conductors 34ª and 68 to one terminal of the resistance 37, thence through the resistance and the lower contact of switch 36 to the winding 33, through the winding and back through the upper contact of switch 36 and conductor 78 to the opposite side of the supply source. Assuming that the elevator tends to come to rest before the floor is reached, it is brought slowly upward to the desired landing and at the appropriate point the vane 50 terminates, whereupon the elevator is brought to rest by the application of the solenoid brake.

It will be observed that in case both of the relays 43 and 44 pick up neither one of the switches 35 and 36 will be energized.

If the elevator speed is above the low leveling speed when the vane takes control, the elevator will obviously be further decelerated by regenerative braking until the leveling speed is reached. In case the elevator overruns a floor, either in an upward or downward direction it will be observed that the control will be taken over by the other vane at that floor and the elevator reversed and leveled from the opposite direction.

The downward vanes 49 terminate a short distance, such as a fraction of an inch, above their respective floors whereas the upward vanes 50 terminate a similar distance below their respective floors thus leaving a very limited stopping zone between the vanes at each floor in which the elevator will be stopped automatically. In this connection it should be borne in mind, as previously pointed out, that as shown in Fig. 4 the vanes are both actually located some distance above their respective floors due to the fact that the devices 60 and 61 are mounted near the top of the elevator, and consequently for control purposes the landing floor may be considered as an imaginary one midway between each pair of vanes. As previously noted the point of control of the relay by the vane is very critical, that is, a very small amount of relative movement between the vane and the coils causes the relay to either pick up or drop as the case may be. Thus the relative movement of the vane between the pickup and drop-out positions of the relay and vice versa may be as little as one-eighth or one thirty-second inch, or even less. This characteristic of the control makes it possible to reduce the stopping zone to a very short distance.

It should be noted furthermore that provision is made for stopping the elevator even though the leveling relay 43 or 44, as the case may be, fails to drop out after the elevator moves from the influence of the vane. This is effected by the opposite vane, either downward or upward as the case may be, at the floor. For example, if the relay 44 should fail to drop for a downward stop after the elevator has moved beyond the influence of the corresponding vane 49, then as the elevator continues downward the vane 50 will pick up the relay 43 which, it will be observed, opens the circuit for the coil 35ª previously closed by the relay 44. In a similar manner when the elevator is moving upward if the relay 43 fails to drop out the control circuit will be opened by the relay 44 upon overrunning of the elevator.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. In a system of control, the combination with an electrode device provided with an oscillation circuit, of an electro-magnetic relay, electrical connections between said relay and said circuit including means for rendering said relay responsive only to the non-pulsating component of the current in said circuit, and means for varying an oscillatory condition of said device to effect the operation of said relay.

2. The combination with electrode means provided with an oscillation circuit, a motor means connected to said circuit for controlling said motor, a plurality of windings inductively related to each other so as to induce an oscillatory condition in said electrode means, one of said windings being connected in said oscillation circuit, and means for varying the inductive relation of said windings to control the operation of said motor.

3. The combination with an electrode device provided with an oscillation circuit, a motor, a control device for said motor connected in said circuit so as to be responsive to the non-pulsating component of the current therein, a plurality of windings inductively related to each other so as to produce an oscillatory condition in said circuit, one of said windings being connected in said circuit, and means for varying said inductive relation to control said motor.

4. A control system comprising electrode means provided with input and output circuits, means providing an electrical interlinkage between said circuits whereby an oscillatory condition of said electrode means is maintained, a device to be controlled in said output circuit, and means associated with said first means for varying said electrical interlinkage to control the operation of said device.

5. A control system comprising an electron discharge device provided with input and output circuits, means providing an inductive interlinkage between said circuits whereby an oscillatory condition is normally maintained in said output circuit, a controlled device in said output circuit, and means associated with said first means for varying said inductive interlinkage to reduce said oscillatory condition and thereby produce operation of said controlled device.

6. A control system comprising an electric discharge device provided with input and output circuits, a controlled device connected to said output circuit, a pair of windings mounted in inductive relation to each other for controlling the output circuit of said discharge device in accordance with their inductive relation to each other, one of said windings being connected to said output circuit, and means for varying said inductive relation of said windings to control said output circuit and thereby operate said control means.

7. A control system comprising an electrode device provided with grid and plate circuits, windings in said grid and plate circuits arranged to inductively cooperate with each other to maintain an oscillatory condition in said electrode device, a controlled device connected to said plate circuit so as to be responsive to the non-pulsating component of the current therein, and means for varying the inductive relation of said windings to vary said oscillatory condition and thereby produce operation of said controlled device.

8. A control system comprising an electron discharge device provided with input and output circuits, windings connected in said input and output circuits respectively, said windings being mounted in spaced inductive relation to each other, a controlled device connected to said output circuit, and an electrically conducting member arranged to be inserted between said windings so as to vary their inductive relation and thereby effect the operation of said controlled device.

9. A control system for an object movable with relation to another object, comprising driving means for said first object, an electrode device provided with an oscillation circuit, control means for said driving means connected to said circuit including means for rendering said control means responsive only to the non-pulsating component of the current in said oscillation circuit, and a device for varying an oscillatory condition of said circuit to vary said non-pulsating current component to effect the operation of said control means, said devices being mounted on said objects respectively so as to come into cooperative relation to effect the operation of said control means when said objects are in predetermined relative positions.

10. A control system for an object movable in a constrained path, comprising driving means for the object, an electrode device provided with an oscillation circuit, control means for said driving means in said circuit including means for rendering said control means responsive only to the non-pulsating component of the current in said oscillation circuit, and means cooperating with said electrode device at a predetermined point in the travel of said object for varying an oscillatory condition of said circuit so as to vary said non-pulsating current component and thereby operate said control means.

11. A control system for an object movable in a constrained path, comprising driving means for the object, a plurality of electron discharge devices, each of said electron discharge devices being provided with input and output circuits, control means connected in said output circuit for respectively controlling said driving means for forward or reverse operation, windings connected in the grid and output circuits of said devices, said windings being arranged in inductive relation so as to normally maintain an oscillatory condition in said devices, and electrically conducting vanes arranged in spaced relation in the path of said object so as to cooperate successively with the windings of said electron discharge devices to vary said oscillatory condition and thereby produce operation of one or the other of said control means to control the movements of said object in each direction.

12. A control system for elevators and the like comprising a plurality of inductively related radio frequency windings, control means for the elevator responsive to the inductive relation of said windings, and means cooperating with said windings during the movement of the elevator for varying their inductive relation to control the movements of the elevator.

13. A control system for elevators and the like comprising driving means for the elevator, control means for said driving means including inductively related radio frequency windings, and members in the hatchway arranged to vary said inductive relation to effect the operation of said control means.

14. A control system for elevators and the like comprising driving means for the elevator, control means for said driving means including inductively related radio frequency winding, said windings being spaced apart, and a plurality of electrically conducting vanes, one located at each of a plurality of floors, arranged to pass between said windings during the movement of the elevator and thereby vary their inductive relation to control the movements of the elevator.

15. A control system for elevators and the like, comprising an electron discharge device provided with an oscillation circuit, a pair of inductively related windings associated with said oscillation circuit and arranged to control the oscillatory condition of said circuit by virtue of their inductive relation with respect to each other, said windings being spaced apart, control means for the elevator in said circuit, and a member arranged to move between said windings when the elevator arrives at a predetermined position, and thereby vary their inductive relation to effect the control of the elevator.

16. A control device for elevators and the like, comprising an electric discharge device provided with input and output circuits, control means for said elevator connected to said output circuit, a pair of windings mounted in inductive relation to each other for controlling the output circuit of said discharge device in accordance with their inductive relation to each other, one of said windings being connected to said output circuit, and means cooperating with said windings at a predetermined point in the travel of the elevator for varying said inductive relation of said windings to control said output circuit and thereby operate said control means.

17. A control system for elevators and the like, comprising an electron discharge device provided with an oscillation circuit, oscillation control means connected to said circuit including a plurality of windings mounted in inductive relation to each other, one of said windings being connected to said circuit, elevator control means connected in said circuit, and a plurality of devices, one located at each of a plurality of landings, arranged to cooperate with said windings to vary their inductive relation to each other and thereby vary the oscillatory condition of said circuit to effect the operation of said elevator control means.

18. A control system for elevators and the like comprising an electric discharge device provided with input and output circuits, control means for said elevator connected to said output circuit, a pair of windings mounted in inductive relation to each other for controlling the output circuit of said discharge device in accordance with their inductive relation to each other, said windings being connected to said input and output circuits respectively, and a member arranged to pass between said windings at a predetermined point in the travel of the elevator for varying said inductive relation of said windings to thereby operate said control means.

19. The combination with an elevator and the like, of driving means for said elevator, an electrode device provided with input and output circuits, control means for said driving means connected in said output circuit, inductively cooperating windings in said input and output circuits, said windings being spaced apart, and a plurality of members, one located at each of a plurality of floors arranged to pass between said windings to vary the inductive relation of said windings and thereby effect the operation of said control means.

20. A control system for elevators and the like, comprising driving means for the elevator, an electron discharge device provided with grid and plate circuits, means included in said plate circuit for controlling said driving means, inductively cooperating windings included respectively in said grid and plate circuits, said windings being spaced apart, and a plurality of electrically conducting vanes, one located at each of a plurality of floors, arranged to pass between said windings, and thereby vary an electrical condition of said plate circuit so as to actuate said control means.

21. A control system for elevators and the like comprising an electron discharge device mounted on said elevator provided with an oscillation circuit, control means for said elevator connected in said circuit, and means mounted in the elevator hatchway so arranged as to control an oscillatory condition of said circuit when the elevator arrives at a predetermined position and thereby control the stopping of the elevator, and means dependent upon the speed of the elevator for disabling said control means.

22. A control system for elevators and the like, comprising driving means for the elevator, control means for said driving means including electrically related members, an electrically conducting vane mounted in the hatchway adjacent each floor so arranged as to electrically isolate said members and thereby effect the operation of said control means to control the movement of the elevator, a switch for controlling said driving means, and means associated with said switch for disabling said control means when the switch is in a running position.

23. A control system for elevators and the like comprising driving means for the elevator, an electron discharge device provided with grid and plate circuits, windings in said grid and plate circuits inductively cooperating to maintain an oscillatory condition in said discharge device, a relay connected in said plate circuit for controlling said driving means to effect the leveling of the elevator, a by-pass condenser connected across said relay whereby said relay is responsive to the non-pulsating component of the current in said plate circuit, and a plurality of electrically conducting vanes in the hatchway, at least one for each floor, said vanes being arranged to pass between said windings during the movement of the elevators whereby said relay is caused to operate.

24. A control system for elevators and the like comprising an electric driving motor for the elevator, switches for controlling the connections of said motor for forward or reverse operation, a manually operated controller for said switches, means for decelerating the elevator when the controller has been thrown to the off-position, auxiliary control means for said switches including electron discharge devices, electrically conducting vanes in the hatchway associated with said electron discharge device so as to vary an oscillatory condition thereof to energize said motor for slow speed operation as the elevator approaches a landing, means for applying a brake to stop the elevator upon the termination of control by said vane, and means associated with said manually operated switch for disabling said auxiliary control means when said controller is in a running position.

25. A control system, comprising in combination with a motor, switches for controlling said motor for forward and reverse operation, operating coils for said switches, electromagnetic relays for jointly controlling said coils, connections whereby said operating coils are both deenergized when said relays are either both energized or both deenergized, and means for selectively operating said relays to control the motor.

26. A control system for elevators and the like comprising driving means for the elevator, switches for controlling said driving means for forward and reverse operation, operating coils for said switches, electromagnetic relays for jointly controlling said coils, said relays being normally in predetermined positions in which said coils are deenergized, connections whereby separate operation of said relays closes circuits for said coils respectively, said circuits when closed by operation of one relay including also the other relay in its normal position, and means in the hatchway for selectively operating said relays to control the elevator.

27. A control system for elevators and the like comprising driving means for the elevator, switches for controlling said driving means for forward and reverse operation, operating coils for said switches, electromagnetic relays for jointly controlling said coils, said relays being normally in predetermined positions in which said coils are deenergized, connections whereby separate operation of said relays closes circuits for said coils respectively, said circuits when closed by operation of one relay including also the other relay in its normal position, means for controlling said relays including a plurality of electron discharge devices one for each relay and means in the hatchway associated with said electron discharge devices for effecting selective operating of said relays to control the elevator.

28. A system of motor control comprising in combination with a motor, a discharge device provided with an oscillation circuit, control means for said motor connected to said circuit, a plurality of inductively related windings for controlling said circuit, one of said windings being connected in said circuit, and means movable into a predetermined relation with respect to said windings so as to vary their inductive relation and thereby control said motor.

29. A system of motor control comprising in combination with a motor, a discharge device provided with an oscillation circuit, control means for said motor connected to said circuit, a plurality of windings inductively related to each other so as to produce an oscillatory condition in said circuit, one of said windings being connected in said circuit, said windings being spaced apart, and a member arranged to be inserted between said windings to vary said oscillatory condition and thereby control said motor.

30. A system of motor control in combination with a motor, comprising a discharge device provided with an oscillation circuit, a control relay for said motor electrically connected with said oscillation circuit, a plurality of windings inductively related to each other so as to normally produce an oscillatory condition in said circuit whereby said relay is maintained in a predetermined position, one of said windings being connected in said circuit and said windings being spaced apart, and an electrically conducting member arranged to be inserted between said windings to vary their inductive relation and thereby prevent said oscillatory condition whereby said relay is operated to another position.

WALTER O. LUM.

DISCLAIMER 1,944,988.—*Walter O. Lum*, Schenectady, N. Y. CONTROL SYSTEM. Patent dated Jan. 30, 1934. Disclaimer filed Jan. 15, 1947, by the assignee, *General Electric Company*.

Hereby enters this disclaimer to claims 1, 9, and 10 in said patent.

[*Official Gazette February 18, 1947.*]